United States Patent
Uchimura et al.

(10) Patent No.: US 11,835,742 B2
(45) Date of Patent: Dec. 5, 2023

(54) SENSOR DEVICE

(71) Applicant: NEC Corporation, Tokyo (JP)

(72) Inventors: Jun Uchimura, Tokyo (JP); Hiroshi Takahashi, Kanagawa (JP); Masato Watanabe, Kanagawa (JP)

(73) Assignee: NEC CORPORATION, Tokyo (JP)

( * ) Notice: Subject to any disclaimer, the term of this patent is extended or adjusted under 35 U.S.C. 154(b) by 806 days.

(21) Appl. No.: 16/963,691

(22) PCT Filed: Jan. 23, 2019

(86) PCT No.: PCT/JP2019/001954
§ 371 (c)(1),
(2) Date: Jul. 21, 2020

(87) PCT Pub. No.: WO2019/151058
PCT Pub. Date: Aug. 8, 2019

(65) Prior Publication Data
US 2021/0080627 A1    Mar. 18, 2021

(30) Foreign Application Priority Data
Feb. 5, 2018  (JP) .................................. 2018-017802

(51) Int. Cl.
*G02B 5/00*      (2006.01)
*G01S 7/48*      (2006.01)
(Continued)

(52) U.S. Cl.
CPC .............. *G02B 5/10* (2013.01); *G01S 7/4817* (2013.01); *G01S 17/32* (2013.01); *G02B 5/09* (2013.01); *G02B 26/105* (2013.01); *G02B 26/12* (2013.01)

(58) Field of Classification Search
USPC ......................................................... 356/5.09
See application file for complete search history.

(56) References Cited

U.S. PATENT DOCUMENTS

2001/0043412 A1*  11/2001  Will ....................... G02B 26/10
                                                                    359/846
2002/0179866 A1   12/2002  Hoeller et al.
(Continued)

FOREIGN PATENT DOCUMENTS

CN          1804678 A        7/2006
JP       H08-193843 A        7/1996
(Continued)

OTHER PUBLICATIONS

International Search Report for PCT Application No. PCT/JP2019/001954, dated Apr. 9, 2019.

*Primary Examiner* — James R Hulka
(74) *Attorney, Agent, or Firm* — Sughrue Mion, PLLC

(57) ABSTRACT

Provided is a sensor device including: a sensor unit that emits light and receives light reflected by an object; and a reflection mirror that is a columnar reflection mirror having a reflection surface on a side face and is configured to be rotated on an axis of the reflection mirror as a rotation axis, in which at least a part of the reflection surface forms a logarithmic spiral having the center at the rotation axis in a cross section perpendicular to the rotation axis, and when light emitted from the sensor unit and reflected by the reflection surface moves in parallel in response to rotation of the reflection mirror, the light reflected by the reflection surface is swept.

17 Claims, 19 Drawing Sheets

(51) Int. Cl.
  *G02B 5/10* (2006.01)
  *G01S 7/481* (2006.01)
  *G01S 17/32* (2020.01)
  *G02B 5/09* (2006.01)
  *G02B 26/10* (2006.01)
  *G02B 26/12* (2006.01)

(56) References Cited

U.S. PATENT DOCUMENTS

| | | | |
|---|---|---|---|
| 2008/0130080 A1* | 6/2008 | Will | G02B 26/10 359/223.1 |
| 2009/0086921 A1* | 4/2009 | Toraya | G01N 23/207 378/145 |
| 2010/0246768 A1* | 9/2010 | Toraya | B82Y 10/00 378/83 |
| 2019/0204419 A1 | 7/2019 | Baba et al. | |
| 2021/0382145 A1* | 12/2021 | Uchimura | G01S 7/4817 |
| 2021/0396874 A1* | 12/2021 | Uchimura | A47F 5/0018 |
| 2022/0003867 A1* | 1/2022 | Uchimura | G01S 7/4817 |
| 2022/0003872 A1* | 1/2022 | Uchimura | B65G 67/04 |

FOREIGN PATENT DOCUMENTS

| | | |
|---|---|---|
| JP | 2000-206425 A | 7/2000 |
| JP | 2003-014420 A | 1/2003 |
| JP | 2008-096295 A | 4/2008 |
| JP | 2008-203091 A | 9/2008 |
| JP | 2009-036775 A | 2/2009 |
| JP | 2012-251900 A | 12/2012 |
| JP | 2017-147973 A | 8/2017 |
| JP | 2017-195569 A | 10/2017 |
| WO | 2018/003852 A1 | 1/2018 |

* cited by examiner

SENSOR DEVICE

This application is a National Stage Entry of PCT/JP2019/001954 filed on Jan. 23, 2019, which claims priority from Japanese Patent Application 2018-017802 filed on Feb. 5, 2018, the contents of all of which are incorporated herein by reference, in their entirety.

TECHNICAL FIELD

The present invention relates to a sensor device.

BACKGROUND ART

Various sensor devices using laser light have been studied. Patent Literature 1 discloses a laser sensor that performs object detection by sweeping laser light in the horizontal direction and the vertical direction. In Patent Literature 1, a polygon mirror in which four side faces of a hexahedron are reflection surfaces is used for a rotary mirror that changes the emission direction of the laser light. Since the reflection direction of the incident laser light changes in accordance with the angle of the rotary mirror, rotation of the rotary mirror enables a sweep of laser light.

CITATION LIST

Patent Literature

PTL 1: Japanese Patent Application Laid-open No. 2012-251900

SUMMARY OF INVENTION

Technical Problem

In the sweeping scheme as disclosed in Patent Literature 1, since the reflection direction of laser light is changed to perform a sweep, the laser light spreads radially from a light-projecting portion of a sensor device. In such a case, since a spacing between light beams spreads as the distance from the sensor increases, resolution decreases, and detection accuracy for a distant object decreases.

The present invention has been made in view of the problems described above and intends to provide a sensor device that can achieve good detection accuracy even for a distant object.

Solution to Problem

According to one example aspect of the present invention, provided is a sensor device including: a sensor unit that emits light and receives light reflected by an object; and a reflection mirror that is a columnar reflection mirror having a reflection surface on a side face and is configured to be rotated on an axis of the reflection mirror as a rotation axis, in which at least a part of the reflection surface forms a logarithmic spiral having the center at the rotation axis in a cross section perpendicular to the rotation axis, and when light emitted from the sensor unit and reflected by the reflection surface moves in parallel in response to rotation of the reflection mirror, the light reflected by the reflection surface is swept.

Advantageous Effects of Invention

According to the present invention, a sensor device that can achieve good detection accuracy even for a distant object can be provided.

DESCRIPTION OF EMBODIMENTS

Exemplary embodiments of the present invention will be described below with reference to the drawings. Throughout the drawings, the same components or corresponding components are labeled with the same reference, and the description thereof may be omitted or simplified.

First Example Embodiment

Figure 1:
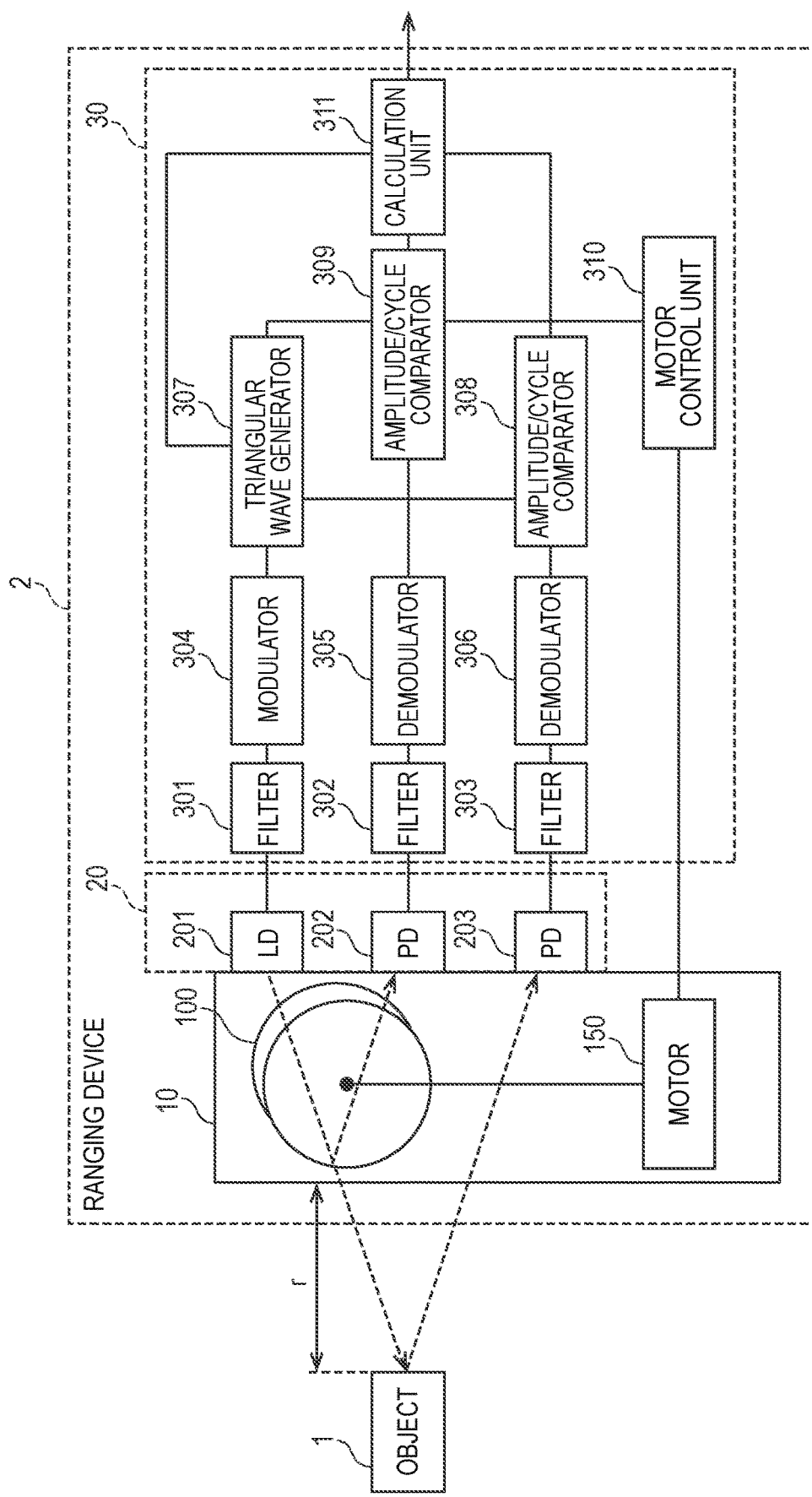
FIG. 1 is a function block diagram of a ranging device according to a first example embodiment.

FIG. 1 is a function block diagram of a ranging device 2 according to the present example embodiment. FIG. 1 illustrates a block diagram of a Light Detection and Ranging (LiDAR) device using a Frequency Modulated Continuous Wave (FMCW) scheme, for example, as one example of the configuration of the ranging device 2. The ranging device 2 emits laser light such as infrared light, visible light, ultraviolet light, or the like, repeats operations of acquiring reflected light to scan a predetermined range, and thereby is able to acquire a distribution of a distance from the ranging device 2 within a predetermined range, an instantaneous velocity, a reflected light intensity, or the like. The ranging device 2 may be used for a use of detection of an object 1, acquisition of the distance to the object 1, or the like. More generally, the ranging device 2 may be referred to as a sensor device. Further, the LiDAR may be referred to as a laser radar.

The ranging device 2 has a reflection mirror unit 10, a sensor unit 20, and a ranging device control unit 30. The ranging device control unit 30 performs control of the overall driving of the ranging device 2 and performs calculation for generation of a signal, analysis, correction, or the like of an acquired signal. The sensor unit 20 has a light emitting element that emits light and has a light receiving element that generates a signal in response to light reflected by the object 1 to be ranged. The reflection mirror unit 10 has a function of changing an optical path of light emitted from the sensor unit 20 and thereby sweeping the light emitted from the ranging device 2.

The reflection mirror unit 10 has a reflection mirror 100 and a motor 150. The sensor unit 20 has a laser diode (LD) 201 and photodiodes (PD) 202 and 203. The ranging device control unit 30 has filters 301, 302, and 303, a modulator 304, demodulators 305 and 306, a triangular wave generator 307, amplitude/cycle comparators 308 and 309, a motor control unit 310, and a calculation unit 311.

The triangular wave generator 307 generates a triangular wave whose voltage repeatedly increases and decreases with time. A triangular wave generated by the triangular wave generator 307 is output to the modulator 304. Further, the triangular wave is also output to the amplitude/cycle comparators 308 and 309 and the calculation unit 311 as a reference signal used for referencing an amplitude, a cycle, or the like.

The modulator 304 includes a voltage-controlled oscillator (VCO) or the like and generates a frequency modulation wave in accordance with input of a triangular wave voltage generated by the triangular wave generator 307. The generated frequency modulation wave is input to the filter 301. The filter 301 is a bandpass filter whose passband is a frequency of the frequency modulation wave. The frequency modulation wave that has passed through the filter 301 is input to the LD 201. The LD 201 generates laser light based on the input frequency modulation wave. Note that the LD 201 is a light emitting element used for infrared communication that emits laser light having a wavelength of a near-infrared region, for example.

The laser light emitted from the LD 201 enters the reflection mirror unit 10. The reflection mirror 100 inside the reflection mirror unit 10 reflects incident laser light and changes the direction in which the laser light is emitted. The motor 150 is a direct current (DC) motor with an encoder, for example, and rotates the reflection mirror 100. When rotary-driven by the motor 150, the reflection mirror 100 can sweep laser light within a predetermined range. A part of laser light enters the PD 202 as a reference light, and another part is externally emitted out of the ranging device 2.

When laser light externally emitted out of the ranging device 2 is reflected by the object 1 and re-enters the ranging device 2, the reflected light enters the PD 203. Note that, when the distance between the object 1 and the ranging device 2 is r, the reflected light has a longer optical path by 2r than the reference light. Thus, the time the reflected light enters the PD 203 is the time delayed by 2r/c from the time the reference light enters the PD 202, where c denotes the light velocity.

For example, each of the PDs 202 and 203 is a photoelectric conversion element used for infrared communication that receives light having substantially the same wavelength as the LD 201 and converts the received light into charges. Once light enters the PDs 202 and 203, a change in the voltage based on the generated charges is transferred as an electrical signal to the filters 302 and 303 on the subsequent stage. As with the filter 301, each of the filters 302 and 303 is also a bandpass filter whose passband is a frequency of the frequency modulation wave generated by the triangular wave generator 307. The frequency modulation wave that has passed through the filter 302 is input to the demodulator 305, and the frequency modulation wave that has passed through the filter 303 is input to the demodulator 306.

Each of the demodulators 305 and 306 includes a phase-locked loop (PLL) or the like and demodulates an input frequency modulation wave. Since the frequency modulation wave is based on the triangular wave generated by the triangular wave generator 307, signals demodulated by the demodulators 305 and 306 are triangular waves. The triangular wave obtained by demodulation in the demodulator 305 is input to the amplitude/cycle comparator 309, and the triangular wave obtained by demodulation in the demodulator 306 is input to the amplitude/cycle comparator 308.

Each of the amplitude/cycle comparators 308 and 309 includes, for example, a mixer that generates a beat signal. The amplitude/cycle comparator 309 compares the amplitude and cycle of the triangular wave output from the triangular wave generator 307 with the amplitude and cycle of the triangular wave output from the demodulator 305. The comparison result in the amplitude/cycle comparator 309 is output to the calculation unit 311. The amplitude/cycle comparator 308 compares the amplitude and cycle of the triangular wave output from the triangular wave generator 307 with the amplitude and cycle of the triangular wave output from the demodulator 306. The comparison result in the amplitude/cycle comparator 308 is output to the calculation unit 311. Herein, the comparison result may be the difference or the ratio of the amplitudes/cycles of two input signals.

The calculation unit 311 uses a signal based on a reference light output from the amplitude/cycle comparator 308 and a triangular wave output from the triangular wave generator 307 to perform calculation to correct a signal based on reflected light output from the amplitude/cycle comparator 309. Thereby, the calculation unit 311 calculates the intensity of the reflected light, the distance between the ranging device 2 and the object 1, and the instantaneous velocity of the object 1. The ranging device 2 measures the intensity of reflected light, the distance, and the instantaneous velocity by sweeping the laser light within a predetermined range and thereby outputs these values as a two-dimensional reflected light intensity distribution, a two-dimensional distance distribution, and a two-dimensional instantaneous velocity distribution to an external image processing device.

Information of the reference light output from the amplitude/cycle comparator 309 is also output to the motor control unit 310. The motor control unit 310 calculates the current position, a rotational rate, or the like of the reflection mirror 100 based on the information acquired from the amplitude/cycle comparator 309 and the information acquired from an encoder provided to the motor 150. The motor control unit 310 performs control to increase or reduce the rotational rate of the motor 150 based on the information on the current position, the rotational rate, or the like of the reflection mirror 100 and thereby stabilizes the rotational rate of the reflection mirror 100 at a predetermined value.

Some or all of the filters 301, 302, and 303, the modulator 304, the demodulators 305 and 306, the triangular wave generator 307, the amplitude/cycle comparators 308 and 309, the motor control unit 310, and the calculation unit 311 of the ranging device control unit 30 may be formed as a single circuit. Herein, the single circuit may be an application specific integrated circuit (ASIC) or a field programmable gate array (FPGA).

Figure 2:
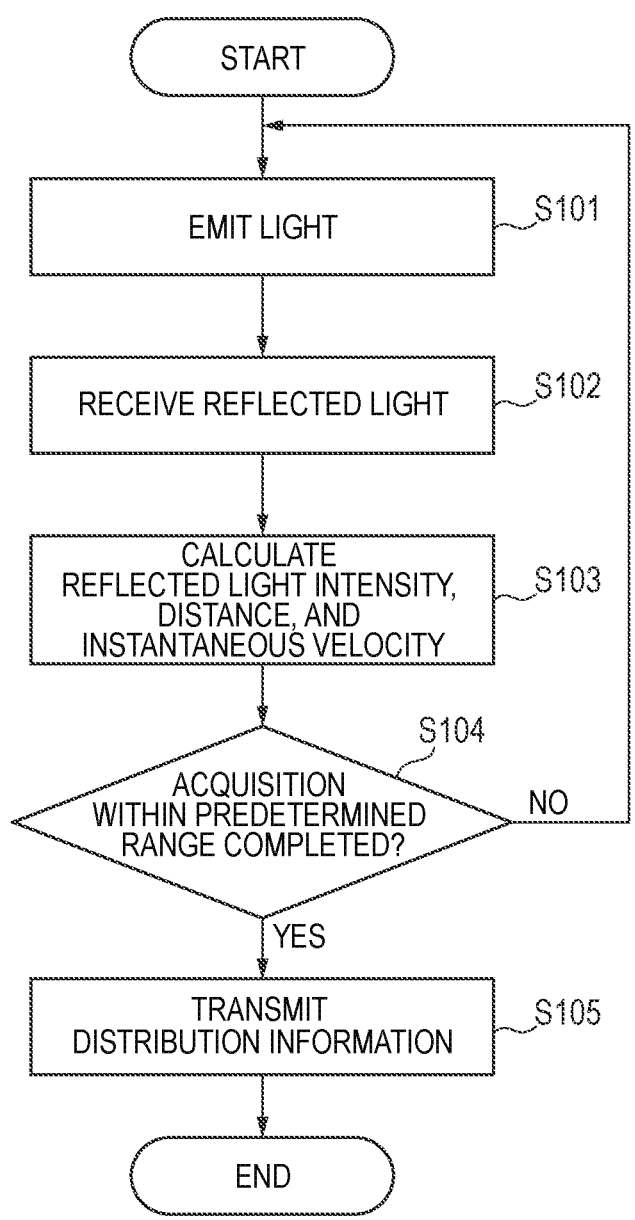
FIG. 2 is a flowchart illustrating an overview of a process performed by the ranging device according to the first example embodiment.
Figure 3:
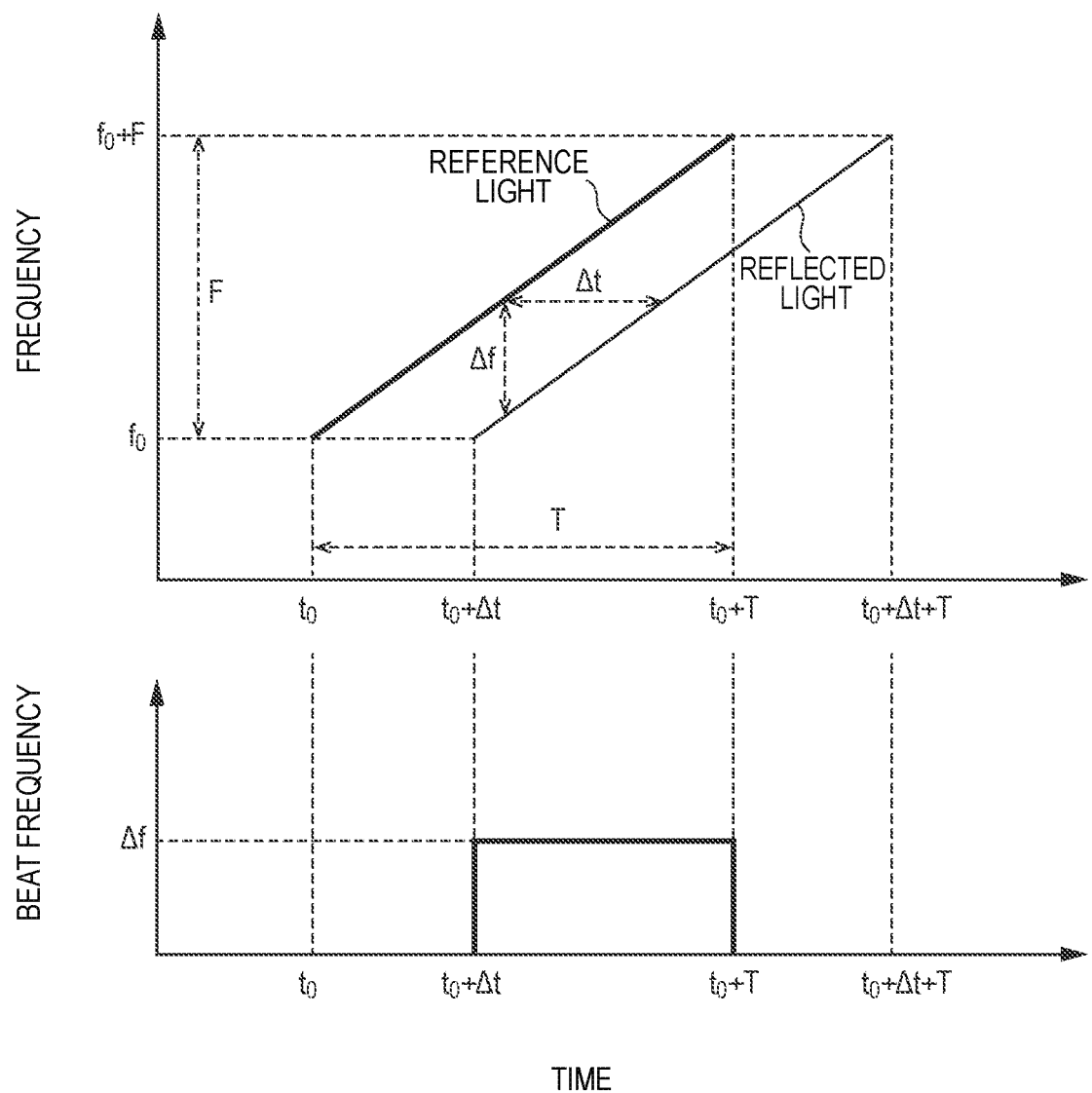
FIG. 3 is a graph illustrating a principle of ranging.
Figure 4:
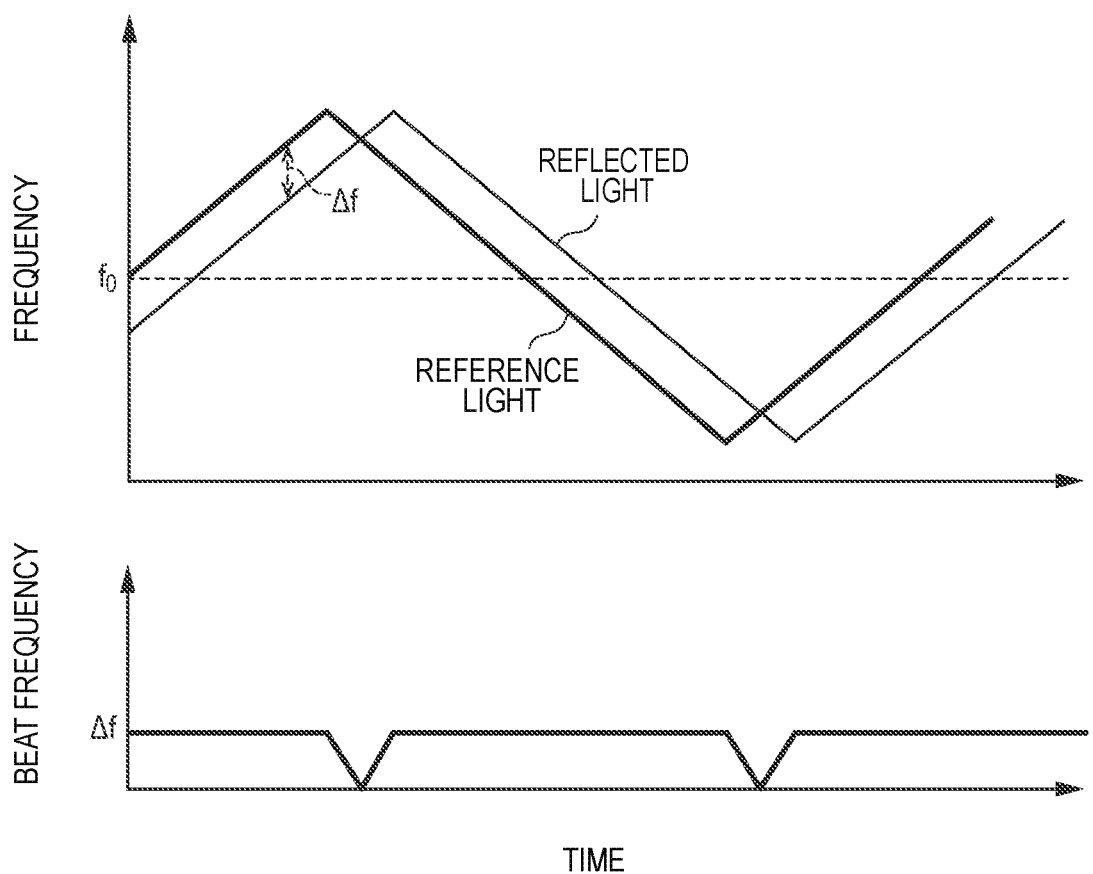
FIG. 4 is a graph illustrating a principle of measurement of an instantaneous velocity.
Figure 5:
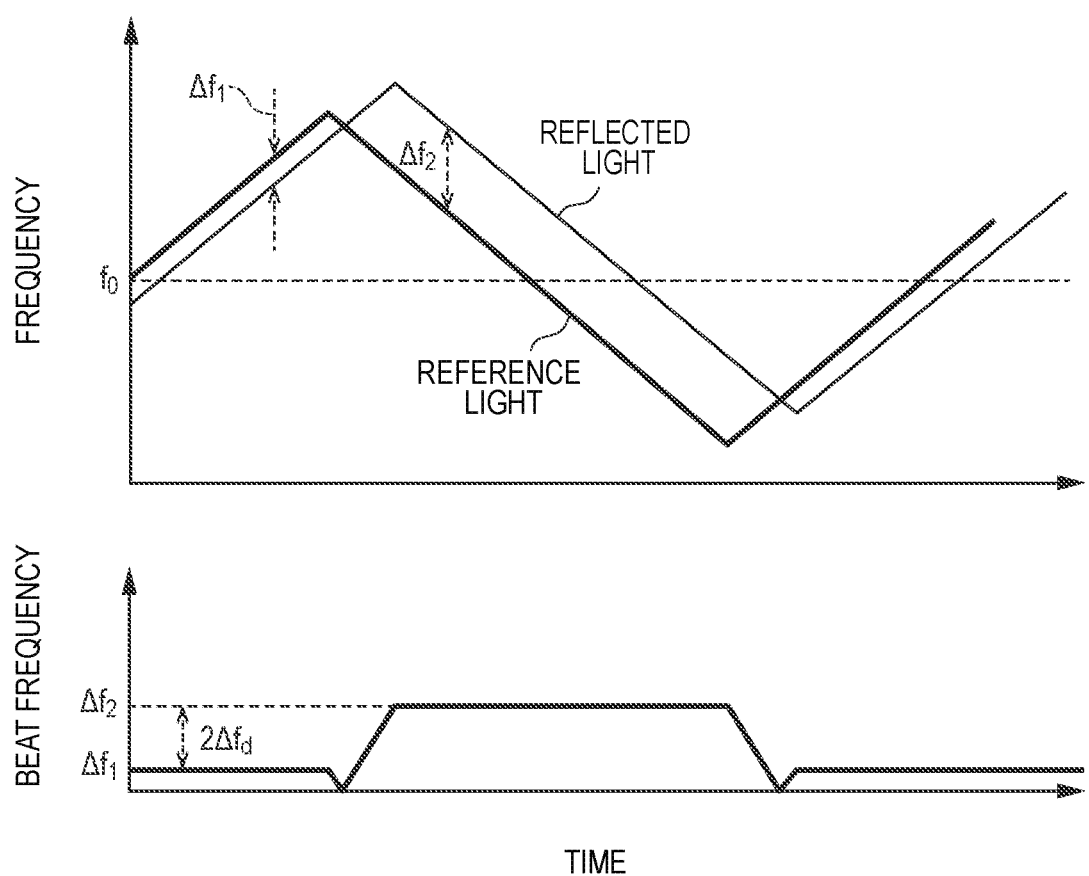
FIG. 5 is a graph illustrating a principle of measurement of an instantaneous velocity.

With reference to FIG. 2 to FIG. 5, the process performed in the ranging device 2 will be more specifically described. FIG. 2 is a flowchart illustrating the overview of the process performed by the ranging device 2 according to the present example embodiment. FIG. 3 is a graph illustrating a principle of ranging. FIG. 4 and FIG. 5 are graphs illustrating a principle of measurement of an instantaneous velocity.

In step S101 of FIG. 2, the ranging device 2 emits laser light having a frequency band of near-infrared light or the like. In step S102, the ranging device 2 receives reflected light reflected by the object 1.

In step S103, the ranging device 2 uses a signal based on the reference light, the reflected light, or the like to calculate the reflected light intensity, the distance, and the instantaneous velocity. Herein, a method of calculating a distance and an instantaneous velocity by using the FMCW scheme will be described with reference to FIG. 3 to FIG. 5.

First, a calculation method of a distance will be described with reference to FIG. 3. The graph of FIG. 3 illustrates a part of a triangular wave based on reference light, a part of a triangular wave based on reflected light, and a temporal change of the beat frequency. According to FIG. 3, the triangular wave based on the reference light has a frequency $f_0$ at time $t_0$, and the frequency increases linearly as time elapses. Then, at time $t_0+T$ after a period T elapsed, the frequency becomes $f_0+F$. That is, the slope of the triangular wave based on the reference light is F/T. The value of the slope F/T of the triangular wave is defined by a triangular wave generated in the triangular wave generator 307 and thus is known. The triangular wave based on the reflected light is input with a delay of a period $\Delta t$ ($=2r/c$) from the reference light as described above and thus has a waveform obtained by shifting the reference light laterally by the period $\Delta t$, as illustrated in FIG. 3. Note that, in FIG. 3, the object 1 is not moving, and it is assumed that there is no shift of the waveform due to a Doppler effect.

Although it may be difficult to measure the period $\Delta t$ at high accuracy because the period $\Delta t$ is an extremely short period, it is possible to measure the frequency $\Delta f$ at relatively high accuracy by generating a beat by using a mixer or the like. Accordingly, the triangular wave based on the reference light and the triangular wave based on the reflected light are mixed to generate a beat, and the frequency of the beat is measured to acquire a difference $\Delta f$ between the frequency of the reference light and the frequency of the reflected light. The ratio of $\Delta f$ and $\Delta t$ matches the ratio of F and T, as apparent from FIG. 3. Thus, $\Delta t$ can be expressed as $\Delta t=\Delta f/(F/T)$ by using $\Delta f$ obtained from the beat and a known value of (F/T). In taking the relationship of $\Delta t=2r/c$ as described above into consideration, the distance from the ranging device 2 to the object 1 is expressed by the following Equation (1):

[Math. 1]
$$r = \frac{c\Delta f}{2(F/T)} \quad (1)$$

It is therefore possible to perform ranging by emitting light that is frequency-modulated so that the frequency increases linearly as time elapses and measuring the beat frequency of a signal based on the reflected light and a signal based on the reference light.

Next, a calculation method of an instantaneous velocity will be described with reference to FIG. 4 and FIG. 5. FIG. 4 and FIG. 5 are graphs illustrating the graph illustrated in FIG. 4 with a wider time range so as to include one cycle of a triangular wave. FIG. 5 illustrates a temporal change of the frequency when the instantaneous velocity of the object 1 is zero. As can be understood from FIG. 4, the beat frequency is constant at $\Delta f$ except for a part near the apex of the triangular wave.

FIG. 5 illustrates a temporal change of the frequency when the object 1 is moving in the direction toward the ranging device 2. The frequency of the light emitted from the ranging device 2 becomes higher due to Doppler effect when reflected by the object 1. Thereby, the beat frequency repeats two values of $\Delta f_1$ and $\Delta f_2$ during increase and decrease of the frequency of the triangular wave. When the frequency change amount due to the Doppler effect is $\Delta f_d$, $\Delta f_d$ is expressed by $\Delta f_d=(\Delta f_2-\Delta f_1)/2$. Further, $\Delta f$ in Equation (1) described above is expressed by $\Delta f=(\Delta f_1+\Delta f_2)/2$. Therefore, by acquiring $\Delta f_1$ and $\Delta f_2$ as a beat frequency, it is possible to calculate the distance r based on Equation (1) also when the object 1 is moving. Furthermore, it is possible to calculate the instantaneous velocity of the object 1 by inputting $\Delta f_d$ to the formula of the light Doppler effect. In such a way, the ranging device 2 of the present example embodiment is a LiDAR device using the FMCW scheme and thus can acquire a distance distribution and an instantaneous velocity distribution. Further, the ranging device 2 of the present example embodiment can acquire a reflected light intensity distribution based on the intensity of a signal based on reflected light.

In step S104 of FIG. 2, the ranging device 2 determines whether or not acquisition of a reflected light intensity distribution, a distance distribution, and an instantaneous velocity distribution within a predetermined range is completed. If the acquisition of the above is not completed (step S104, NO), the process proceeds to step S101 and performs measurement of a reflected light intensity, a distance, and an instantaneous velocity at different measuring points while changing the position to be irradiated with light. If the acquisition of the above is completed (step S104, YES), the process proceeds to step S105. In such a way, in the loop from step S101 to step S104, a sweep for acquiring a reflected light intensity distribution, a distance distribution, and an instantaneous velocity distribution is performed.

In step S105, the ranging device 2 transmits the reflected light intensity distribution, the distance distribution, and the instantaneous velocity distribution (distribution information) to an image processing device outside the ranging device 2. Note that transmission of distribution information in this step is not essential, and instead the ranging device 2 may store the distribution information in a storage medium provided inside or outside the ranging device 2.

Figure 6:
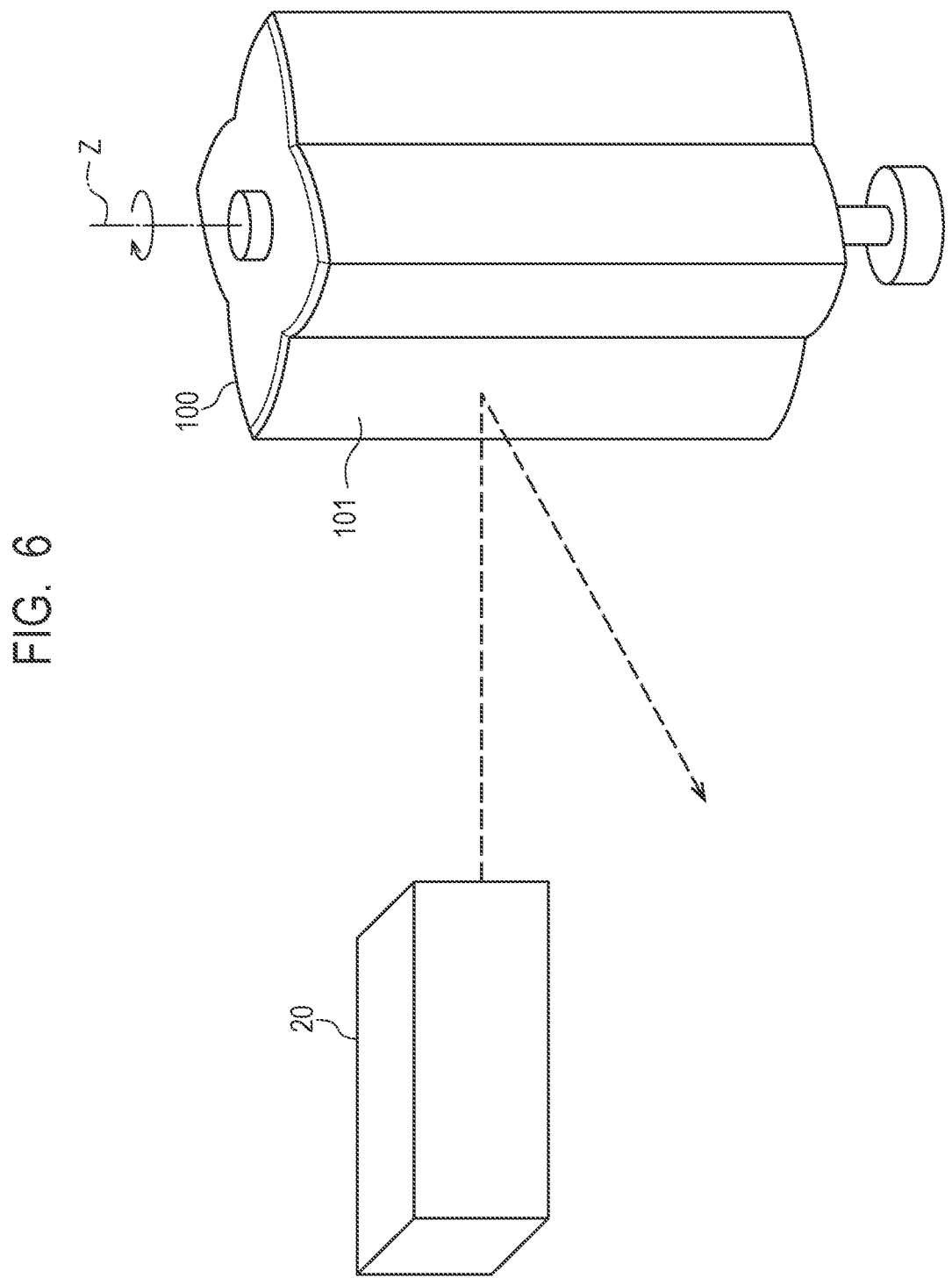
FIG. 6 is a schematic diagram illustrating a configuration of a reflection mirror according to the first example embodiment.

Next, the structure of the reflection mirror 100 will be described with reference to FIG. 6, FIG. 7, FIG. 8A, FIG. 8B, and FIG. 8C. FIG. 6 is a schematic diagram illustrating a configuration of the reflection mirror 100 according to the present example embodiment. The reflection mirror 100 has a columnar shape and has a reflection surface 101 on the side faces thereof. Light emitted from the sensor unit 20 is reflected by the reflection surface 101 and externally emitted out of the ranging device 2. This emitted light is reflected by the object 1 and enters the sensor unit 20 via the same path at the time of emission. The reflection mirror 100 is rotary-driven by the motor 150 on the rotation axis Z. At this time, the light reflected by the reflection surface 101 moves in parallel in accordance with the angle of the reflection mirror 100. Thereby, light emitted from the ranging device 2 is swept.

Figure 7:
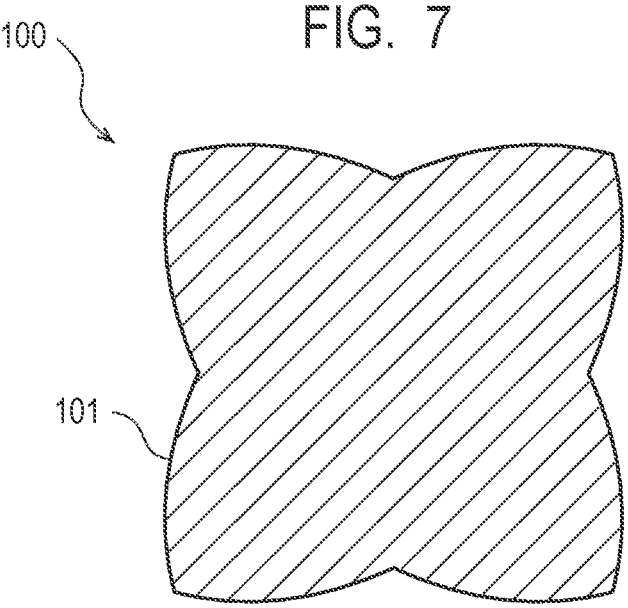
FIG. 7 is a sectional view of the reflection mirror according to the first example embodiment.

FIG. 7 is a sectional view of the reflection mirror 100 according to the present example embodiment in a plane perpendicular to the rotation axis Z. The reflection surface 101 that is the side face of the reflection mirror 100 forms a closed curve in which eight logarithmic spirals are continuously connected in a cross section perpendicular to the rotation axis Z. With a closed curve in which logarithmic spirals are continuously connected as described above, a configuration in which the entire reflection surface 101 that light emitted from the sensor unit 20 may enter forms a logarithmic spiral in a cross section perpendicular to the rotation axis Z is realized. Accordingly, even when light enters any of the surfaces of the reflection mirror 100, it is possible to utilize reflected light for a sweep. Note that a logarithmic spiral may be referred to as an equiangular spiral or a Bernoulli's spiral.

Figure 8A:
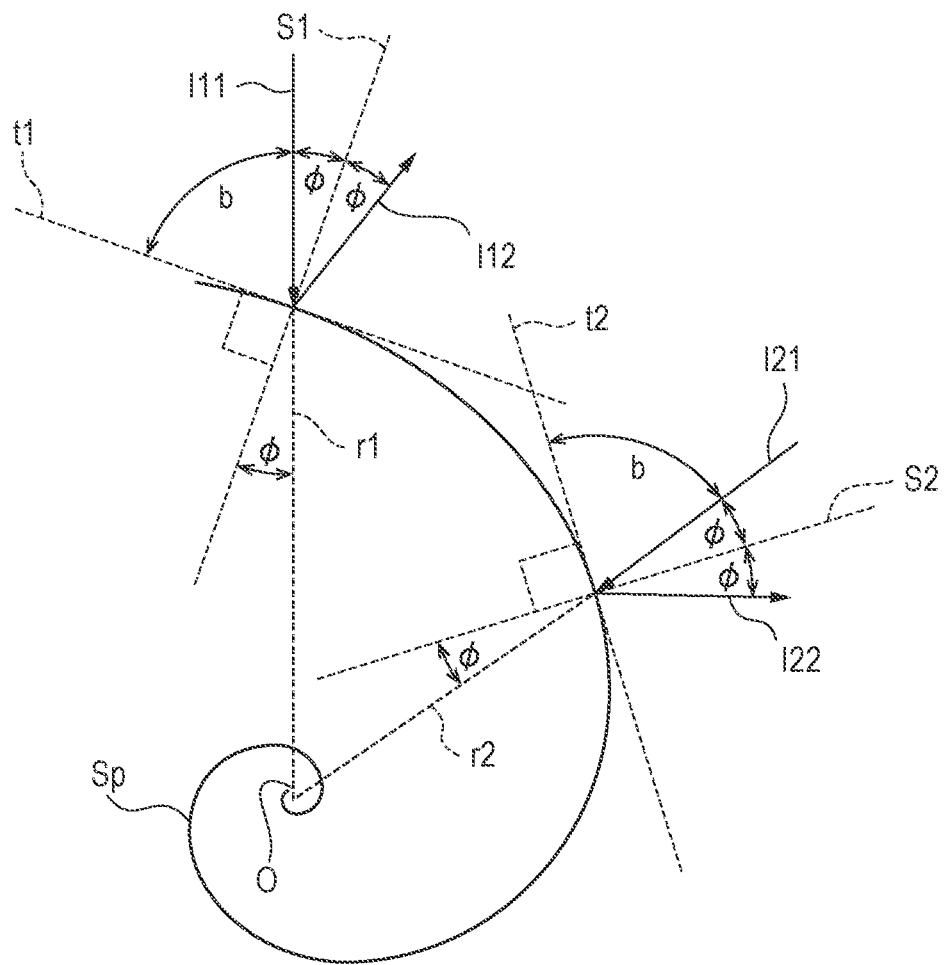
FIG. 8A is a diagram illustrating a reflection of light at a reflection surface forming a logarithmic spiral.

FIG. 8A is a diagram illustrating reflection of light at a reflection surface forming a logarithmic spiral. The logarithmic spiral Sp is expressed by a polar equation of the following Equation (2):

[Math. 2]

$$r = a \cdot \exp(\theta \cdot \cot b) \qquad (2)$$

where r denotes the radius in the polar coordinate, θ denotes the drift angle in the polar coordinate, a denotes the value of r when the value of θ is zero, and b denotes the angle of a line passing through the center of the logarithmic spiral relative to a tangent line of the logarithmic spiral.

Herein, the relationship between the incident light I11 and I21 from the outside of the logarithmic spiral Sp toward the origin O of the polar equation of Equation (2) and the reflected light I12 and I22 thereof is considered. The tangent line and the normal line at a point at which the incident light I11 is reflected by the logarithmic spiral Sp are defined as t1 and S1, respectively, and the tangent line and the normal line at a point at which the incident light I21 is reflected by the logarithmic spiral Sp are defined as t2 and S2, respectively. It is assumed that the incident light I11 is reflected at a point of the radius r1 on the logarithmic spiral Sp, and the incident light I21 is reflected at a point of the radius r2 on the logarithmic spiral Sp (where r1≠r2). In this example, due to a nature of the logarithmic spiral Sp, each of the angle of the incident light I11 relative to the tangent line t1 and the angle of the incident light I21 relative to the tangent line t2 is b. Therefore, the incident angle φ of the incident light I11 relative to the normal line S1 and the incident angle φ of the incident light I21 relative to the normal line S2 are the same angle. Also, the reflection angle φ of the reflected light I12 relative to the normal line S1 and the reflection angle φ of the reflected light I22 relative to the normal line S2 are the same angle. When φ and b are angles expressed in the circular measure, the relationship between φ and b is as expressed by the following Equation (3).

[Math. 3]

$$\phi = \frac{\pi}{2} - b \qquad (3)$$

From the above discussion, it is found that the incident light I11 from the outside of the logarithmic spiral Sp toward the origin O is reflected at the same reflection angle φ even when reflected at any point on the logarithmic spiral Sp. Thus, when the logarithmic spiral Sp is rotated on the origin O, the point at which the incident light I11 to the logarithmic spiral Sp is reflected changes, but the direction in which the reflected light I12 is reflected does not change, and therefore the reflected light I12 moves in parallel.

In the reflection mirror 100 of the present example embodiment, to utilize the above nature, at least a part of a reflection surface forms a logarithmic spiral in which the rotation axis Z matches the origin O in a cross section perpendicular to the rotation axis Z. Accordingly, rotation of the reflection mirror 100 on the rotation axis Z enables a sweep so that the light reflected by the reflection surface 101 moves in parallel.

Figure 8B:
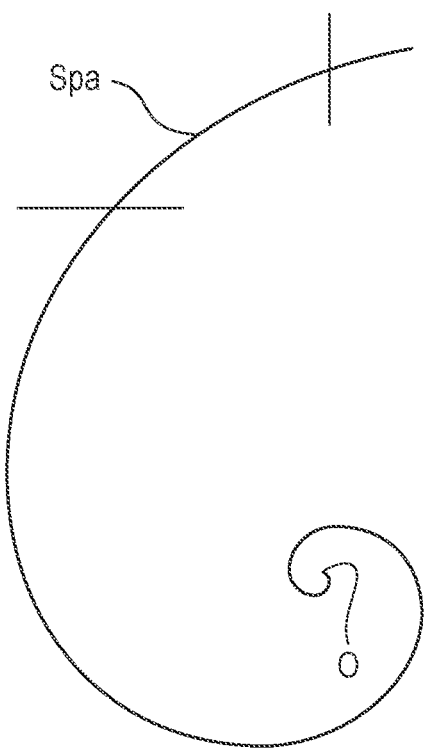
FIG. 8B is a diagram illustrating a drawing method of a closed curve of a reflection surface.
Figure 8C:
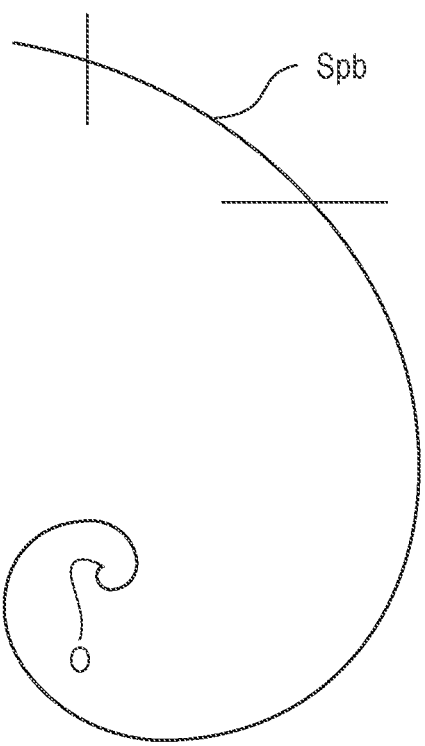
FIG. 8C is a diagram illustrating a drawing method of a closed curve of a reflection surface.

FIG. 8B and FIG. 8C are diagrams illustrating a drawing method of a logarithmic spiral forming a reflection surface of a reflection mirror. FIG. 8C illustrates a method of cutting a part out of the logarithmic spiral Sp of FIG. 8A to obtain a logarithmic spiral Spb. FIG. 8B illustrates a method of obtaining a logarithmic spiral Spa from a logarithmic spiral that is mirror-symmetrical to that of FIG. 8C. It is possible to obtain a closed curve having the external shape of the reflection surface 101 as illustrated in FIG. 7 by continuously connecting a plurality of logarithmic spirals Spa and logarithmic spirals Spb so that the origins O thereof overlap each other to form a closed curve.

Figure 9A:
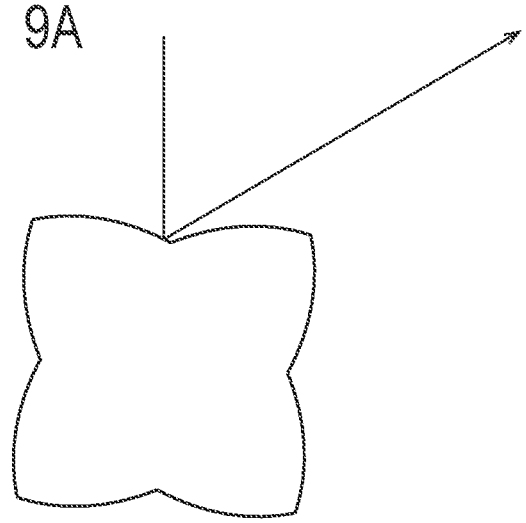
FIG. 9A is a diagram illustrating a parallel sweep of light by using the reflection mirror of the first example embodiment.
Figure 9B:
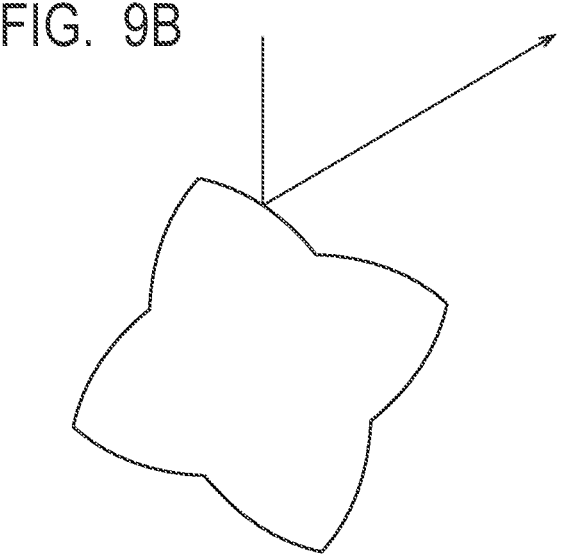
FIG. 9B is a diagram illustrating a parallel sweep of light by using the reflection mirror of the first example embodiment.
Figure 9C:
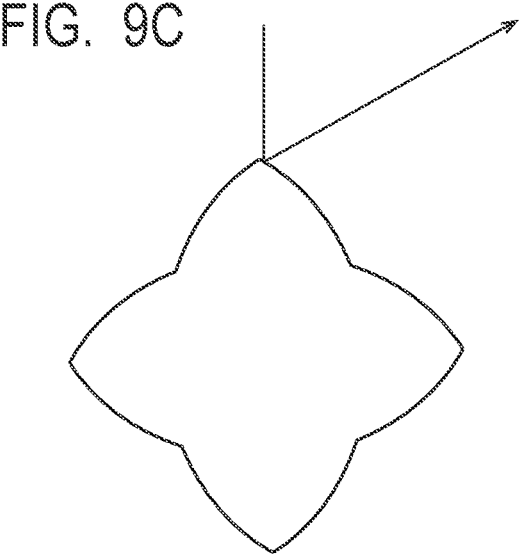
FIG. 9C is a diagram illustrating a parallel sweep of light by using the reflection mirror of the first example embodiment.
Figure 9D:
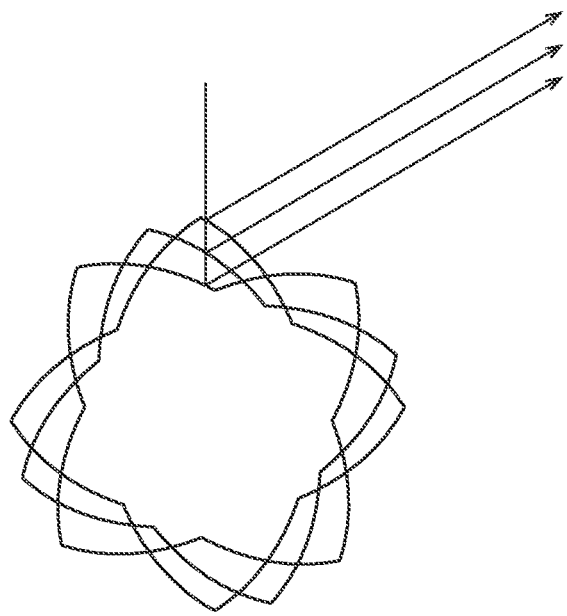
FIG. 9D is a diagram illustrating a parallel sweep of light by using the reflection mirror of the first example embodiment.

FIG. 9A to FIG. 9D are diagrams illustrating a parallel sweep of light by using the reflection mirror 100 and illustrates an optical path and a reflection surface in top view. FIG. 9A to FIG. 9C illustrate a change of an optical path when the reflection mirror 100 is rotated clockwise. FIG. 9D illustrates a view in which FIG. 9A to FIG. 9C are overlapped for display in order to illustrate the change of the optical path in more detail. Each drawing illustrates a view in which light emitted from the sensor unit 20 enters the reflection mirror 100 from the upper direction in the drawing and is reflected in the right upper direction.

As can be understood from FIG. 9D, the optical path of a reflected light from the reflection mirror 100 moves in parallel direction in response to the rotation of the reflection mirror 100. Thus, the ranging device 2 of the present example embodiment can sweep the emission light in parallel. In this sweeping method, since the spacing between light beams does not spread even at a position distant from the ranging device 2, it is possible to improve detection accuracy with respect to a distant object compared to a sweeping scheme in which emission light spreads radially. Therefore, according to the present example embodiment, the ranging device 2 that can obtain good detection accuracy even for a distant object can be provided.

Figure 9E:
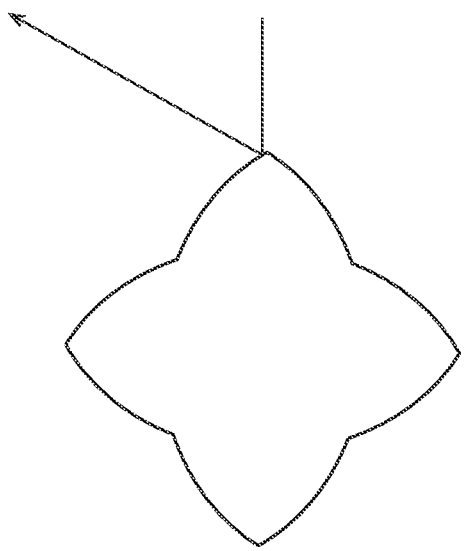
FIG. 9E is a diagram illustrating a change of a sweep range of light by using the reflection mirror of the first example embodiment.
Figure 9F:
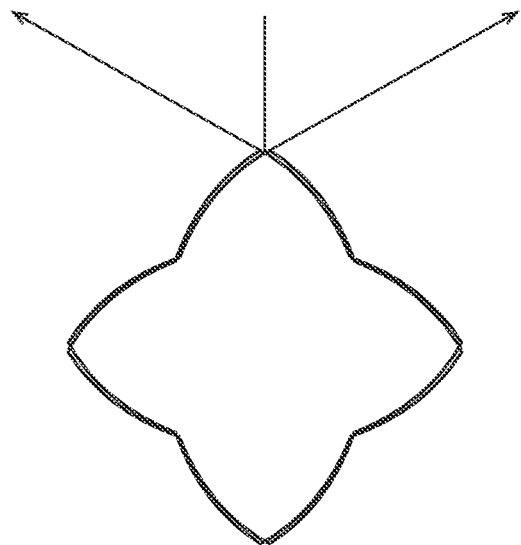
FIG. 9F is a diagram illustrating a change of a sweep range of light by using the reflection mirror of the first example embodiment.

FIG. 9E and FIG. 9F are diagrams illustrating a change in the light sweep range caused by the reflection mirror 100. FIG. 9E illustrates an optical path when the reflection mirror 100 is further rotated clockwise from the state of FIG. 9C. FIG. 9F illustrates a view in which FIG. 9C and FIG. 9E are overlapped for display in order to illustrate the change of the optical path in more detail. While the light is reflected in the right direction of the drawing in FIG. 9C, the light is reflected in the left direction of the drawing in FIG. 9E. In such a way, in the ranging device 2 of the present example embodiment, the reflection direction changes when the surface that reflects light changes due to the rotation of the reflection mirror 100. By using such a nature, it is possible to provide the ranging device 2 that can scan two different ranges.

Figure 10:
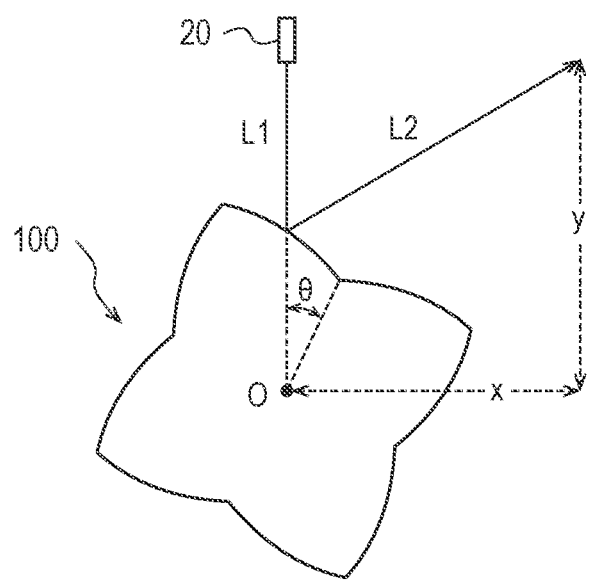
FIG. 10 is a diagram illustrating a parameter of an optical path of reflected light.

With reference to FIG. 10, FIG. 11A, FIG. 11B, and FIG. 11C, a change of an optical path of reflected light in accordance with a rotation angle of the reflection mirror 100 will be described in more detail. FIG. 10 is a diagram illustrating a parameter of an optical path of reflected light. As illustrated in FIG. 10, the rotation angle of the reflection mirror 100 is denoted as θ, the optical path length from the sensor unit 20 to the reflection surface 101 is denoted as L1, and the optical path length from the reflection surface to predetermined coordinates (x, y) is denoted as L2. As the value of the rotation angle θ changes, the optical path lengths L1 and L2 change. Further, if x is a constant value, the value of y changes in accordance with the change of the value of the rotation angle θ.

Figure 11A:
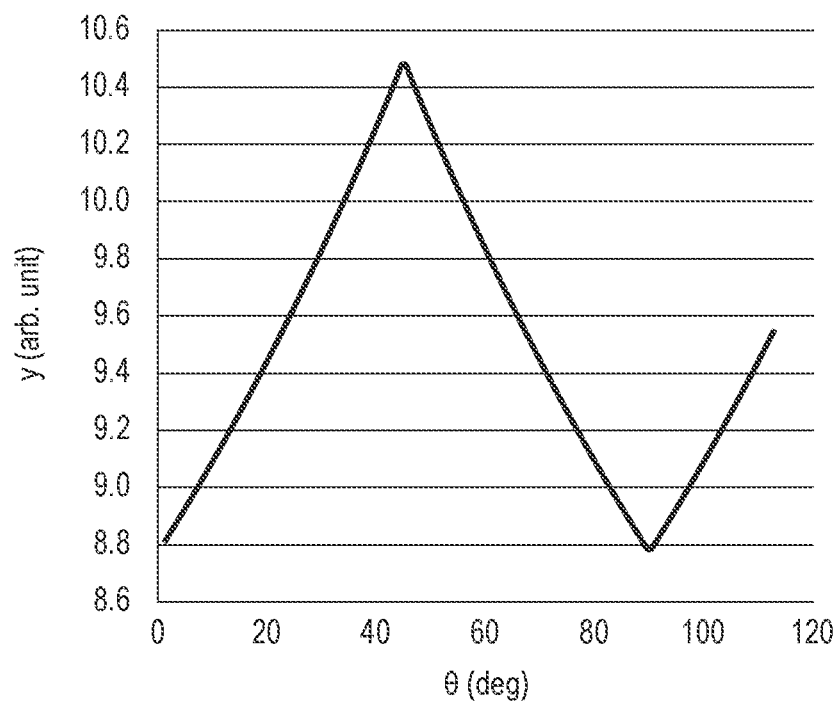
FIG. 11A is a graph illustrating a position of reflected light.
Figure 11B:
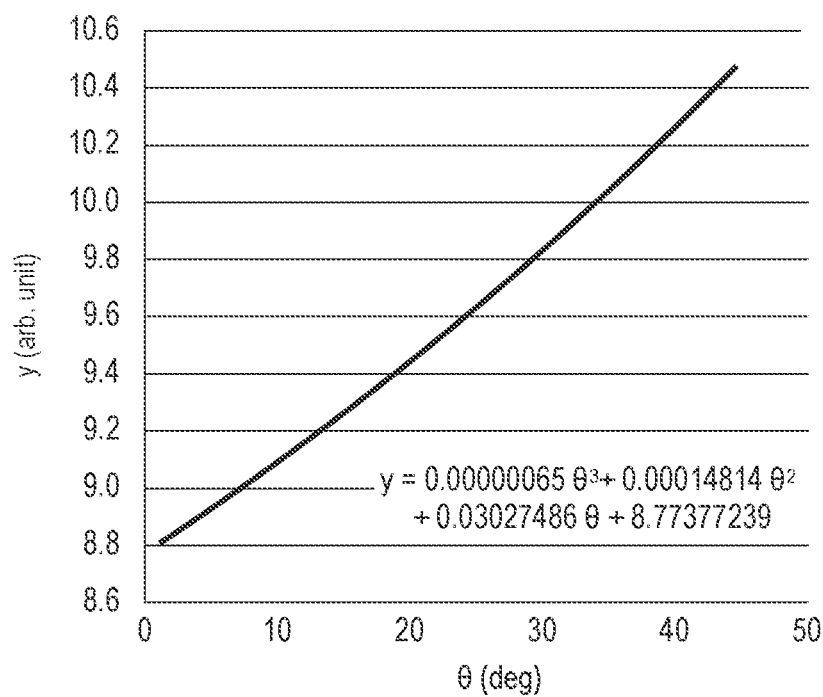
FIG. 11B is a graph illustrating a position of reflected light.

FIG. 11A and FIG. 11B are graphs illustrating a position of reflected light. The horizontal axis represents the rotation angle θ, and the vertical axis represents the value of y illustrated in FIG. 10. As illustrated in FIG. 11A, since the value of y repeatedly increases and decreases within a predetermined range in accordance with the rotation angle, the reflected light is swept within a predetermined range. FIG. 11B is a graph illustrating a range from 0 degree to 45 degrees of FIG. 11A in more detail. The formula illustrated in FIG. 11B is an equation of an approximate curve calculated by third order polynomial approximation. As is apparent from this approximate equation, the value of y is not linear with respect to the rotation angle θ. Thus, a sweep rate of light is not constant when the reflection mirror is rotated at a constant rate, and this may cause an error factor. To reduce this error factor, the motor control unit 310 may correct the rotational rate of the motor 150 by using the equation described above. Alternatively, the error factor may be reduced by performing correction of a measuring timing by using the equation described above at the calculation unit 311.

Figure 11C:
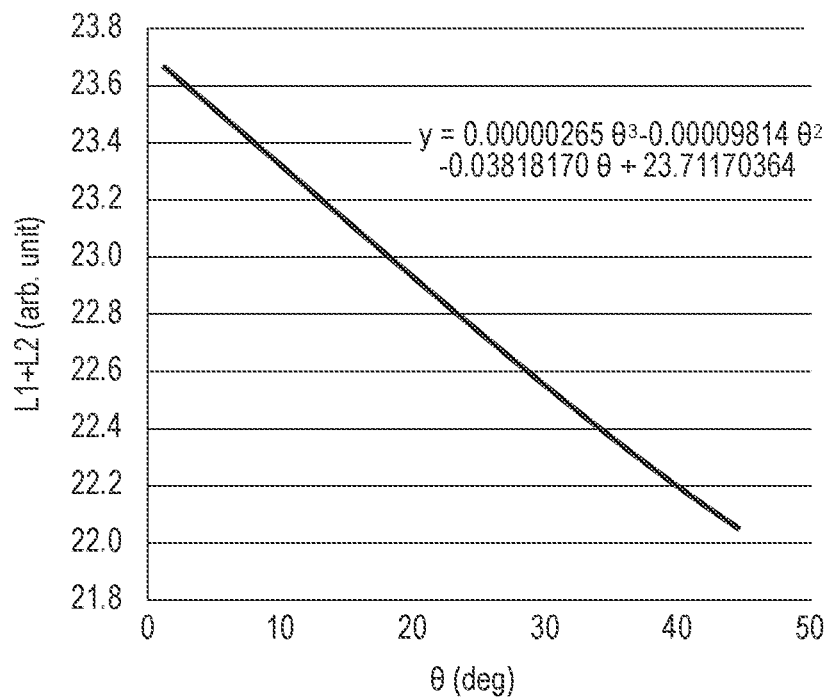
FIG. 11C is a graph illustrating an optical path length of light.

FIG. 11C is a graph illustrating an optical path length of the light. The horizontal axis represents the rotation angle θ, which is a sum of the optical path length L1 and the optical path length L2. As illustrated in FIG. 11A, the optical path length changes in accordance with the rotation angle. This difference in the optical path length is superimposed on the distance measured by the ranging device 2 and thus may cause an error factor with respect to the distance. The formula illustrated in FIG. 11C is an equation of an approximate curve calculated by third order polynomial approximation. As is apparent from this approximate equation, the value of L1+L2 with respect to the rotation angle θ is also not linear. It is possible to reduce the error factor by performing correction of a measurement value by using the equation described above at the calculation unit 311.

Figure 12:
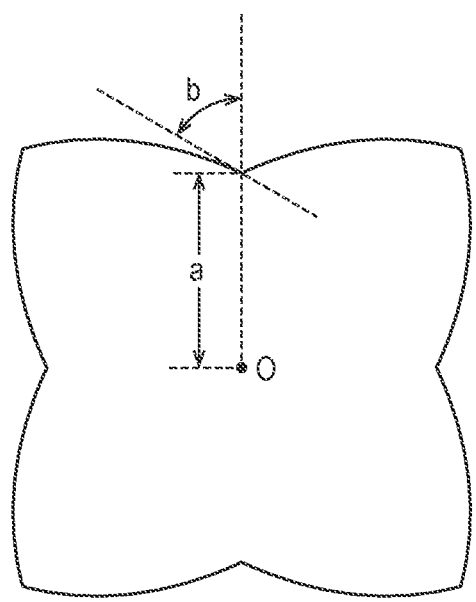
FIG. 12 is a diagram illustrating parameters that define the shape of a reflection surface of a reflection mirror.

Selection of the shape of the reflection surface 101 of the reflection mirror 100 will be described with reference to FIG. 12, FIG. 13, and FIG. 14. FIG. 12 is a diagram illustrating parameters that define the shape of a reflection surface of a reflection mirror. Parameters that define the shape of the logarithmic spiral Sp are two values of a and b, as indicated by Equation (2). As illustrated in FIG. 12, the value a corresponds to the radius of a valley of a reflection mirror, and the value b is an angle of a tangent line at the valley relative to a line passing through the center of the logarithmic spiral Sp. Hereafter, the angle b may be referred to as a tangential angle. In FIG. 12, the value of the tangential angle b in the degree measure is 60 degrees. Further, the number n of pairs to a ridge and a valley of the reflection surface 101 may be a parameter that defines the shape of the reflection surface 101. By changing the number of logarithmic spirals Sp to be connected, it is possible to change the number n of pairs to a ridge and a valley of the reflection surface 101. Any number of an integer greater than or equal to two may be selected as appropriate for the number n of pairs to a ridge and a valley of the reflection surface 101. In the example illustrated in FIG. 12, the number n of pairs to a ridge and a valley is four.

Figure 13:
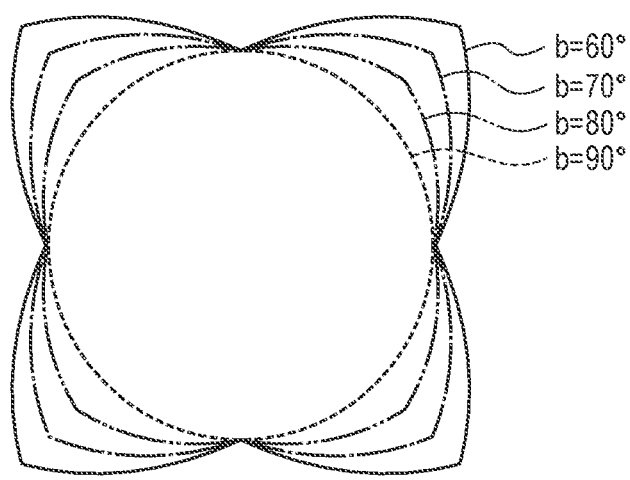
FIG. 13 is a diagram illustrating a difference in the shape of a reflection surface in accordance with a tangential angle.

FIG. 13 is a diagram illustrating a difference in the shape of the reflection surface 101 in accordance with the tangential angle b. FIG. 13 illustrates shapes of the reflection surface 101 when the tangential angle b is 60 degrees, 70 degrees, 80 degrees, and 90 degrees in the degree measure. As is apparent from FIG. 13 and Equation (2), if the tangential angle b is 90 degrees, the reflection surface 101 is circular and cannot be applied to the reflection mirror 100 used for sweeping the reflected light. Further, if the tangential angle b is less than 60 degrees, since reflected light reflected by a certain ridge of the reflection surface 101 interferes with an adjacent ridge, the reflected light cannot be utilized effectively. It is therefore desirable that the range of the tangential angle b applied to the reflection mirror 100 of the present example embodiment be greater than or equal to 60 degrees and less than 90 degrees.

Further, it is more desirable that the range of the tangential angle b be greater than or equal to 60 degrees and less than 80 degrees. This is because, when the tangential angle b ranges from 80 degrees to 90 degrees, the shape of the reflection surface 101 is close to a circle and the sweep range of reflected light is narrow.

Further, it is much more desirable that the range of the tangential angle b be greater than or equal to 60 degrees and less than 70 degrees. This is because, when the tangential angle b is greater than or equal to 60 degrees and less than 70 degrees, the sweep range of reflected light can be wider than in the case of 70 degrees or greater.

Further, it is much more desirable that the range of the tangential angle b be around 60 degrees. This is because the sweep range of reflected light is the largest when the tangential angle b is 60 degrees as far as the reflected light does not interfere with an adjacent ridge.

Figure 14:
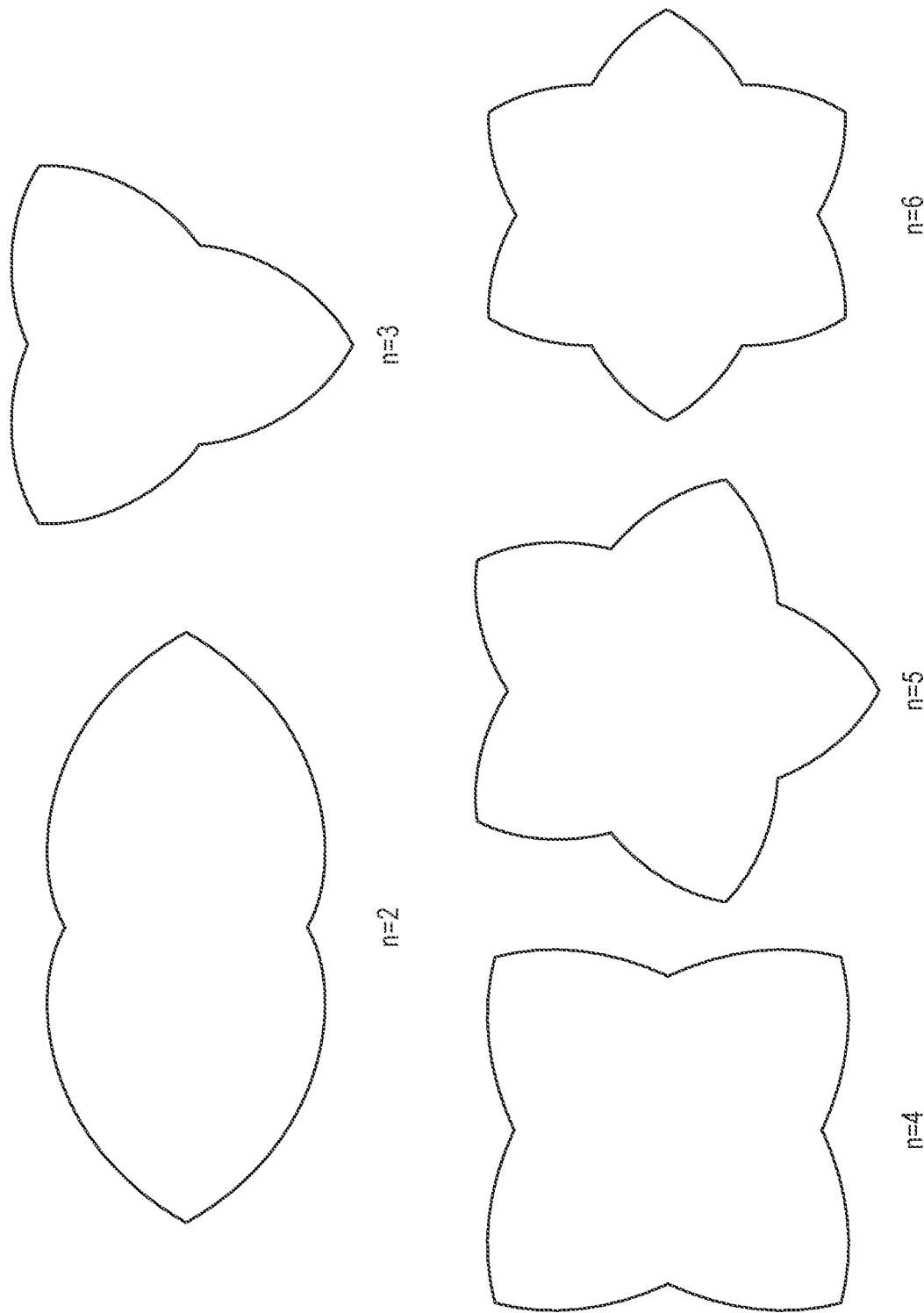
FIG. 14 is a diagram illustrating a difference in the shape of a reflection surface in accordance with the number of pairs of a ridge and a valley.

FIG. 14 is a diagram illustrating a difference in the shape of the reflection surface 101 in accordance with the number n of pairs of a ridge and a valley. Although FIG. 14 illustrates five examples of the shape of the reflection surface 101 for n=2 to 6, n may be 7 or greater. Since a greater value of n results in a shorter length of a single logarithmic spiral of the reflection surface 101, the sweep range of reflected light is narrower, however, it is possible to perform a fast sweep without increasing the rotational rate of the motor 150 so much because a single sweep can be completed by a smaller rotation angle. The value of n can be set as appropriate taking such a feature into consideration.

Second Example Embodiment

As a second example embodiment of the present invention, an optical system that may be additionally provided inside the reflection mirror unit 10 will be described. Since components other than the optical system is the same as those of the first example embodiment, the description thereof will be omitted. The optical system has a function of expanding the sweep width when light reflected by the reflection mirror 100 is swept in response to rotation of the reflection mirror 100.

Figure 15:
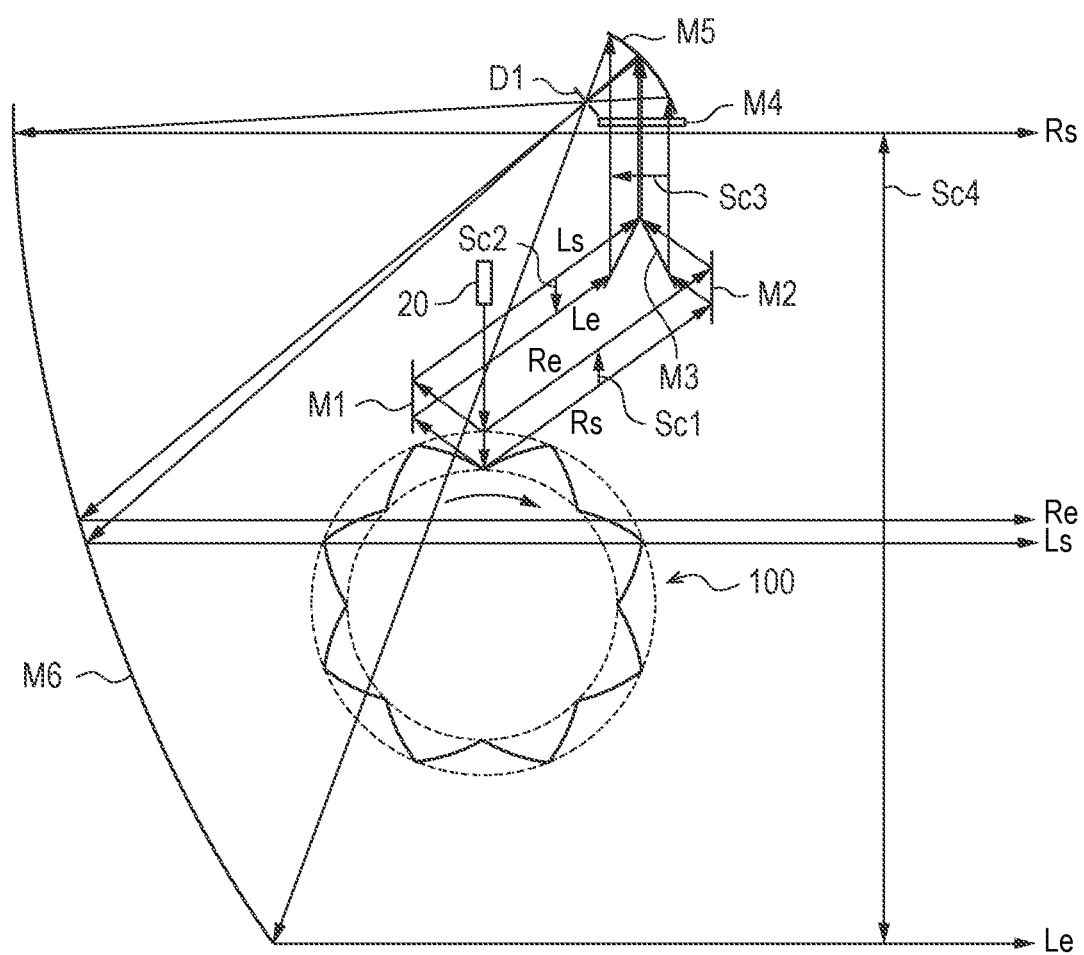
FIG. 15 is a schematic diagram illustrating a configuration of an optical system provided in a reflection mirror unit of a second example embodiment.

FIG. 15 is a schematic diagram illustrating a configuration of an optical system provided in the reflection mirror unit 10 of the present example embodiment. The optical system arranged on the optical path of light reflected from the reflection mirror 100 includes plane mirrors M1 and M2, a triangular plane mirror M3, a plane mirror group M4, parabolic mirrors M5 and M6, and a diaphragm Dl. Note that, although the number n of pairs of a ridge and a valley of the reflection mirror 100 illustrated in FIG. 15 is eight, the number n is not limited thereto.

As described with reference to FIG. 9A to FIG. 9F, the light emitted from the sensor unit 20 is swept so as to move in parallel in response to rotation of the reflection mirror 100, and the reflection direction changes discontinuously in two of the left and right directions. The optical paths Ls, Le, Rs, and Re illustrate an optical path of reflected light that changes in response to rotation of the reflection mirror 100.

When the reflection mirror 100 rotates in the right direction from the state illustrated in FIG. 15, the light reflected in the right direction is swept from the optical path Rs to the optical path Re. FIG. 15 illustrates this sweep by the arrow Sc1. When the reflection mirror 100 is further rotated and the surface by which the light is reflected changes, the reflection direction of the light changes to the left direction, and the light is swept from the optical path Ls to the optical path Le. FIG. 15 illustrates this sweep by the arrow Sc2.

The light reflected in the left directions (the optical paths Ls and Le) is reflected by the plane mirror M1 and enters the reflection surface on the left side of the triangular plane mirror M3. The light reflected in the right directions (the optical paths Rs and Re) is reflected by the plane mirror M2 and enters the reflection surface on the right side of the triangular plane mirror M3. The reflected light at the triangular plane mirror M3 is directed upward in both cases where the reflected light enters the reflection surface on the left side and where the reflected light enters the reflection surface on the right side. The sweep direction when the reflection mirror 100 is rotated in the right direction is indicated by the arrow Sc3.

The reflected light at the triangular plane mirror M3 enters the plane mirror group M4. The plane mirror group M4 is formed of a plurality of plane mirrors that reflect light and has a function of shifting, to the depth direction of FIG. 15, a plane through which the light passes. That is, a plane on which the light before passing through the plane mirror group M4 (or light immediately after reflected by the reflection mirror) moves in parallel in response to rotation of the reflection mirror 100 and a plane on which the light after passing through the plane mirror group M4 moves in parallel in response to rotation of the reflection mirror 100 are planes different from each other in depth direction of FIG. 15. With a change of a light passage plane, the optical path of the light that has passed through the plane mirror group M4 can avoid optical members such as the reflection mirror 100.

The light that has passed through the plane mirror group M4 enters the parabolic mirror M5. The light reflected by the parabolic mirror M5 passes through the focal point of the parabolic mirror M5 and is further reflected by the parabolic mirror M6. Here, the parabolic mirror M5 and the parabolic mirror M6 are arranged such that the concave surfaces thereof are faced to each other and the focal points thereof are the same. Due to the nature of a parabolic mirror, the reflected light reflected by the parabolic mirror M6 is parallel light and is emitted from the ranging device 2. Here, the sweep direction when the reflection mirror 100 is rotated in the right direction is indicated by the arrow Sc4. The diaphragm Dl is arranged near the focal points of the parabolic mirror M5 and the parabolic mirror M6. The diaphragm Dl has a function of restricting the range through which light passes. Accordingly, the depth of field of the ranging device 2 becomes deeper, and the accuracy of distribution information obtained by the ranging device 2 is improved.

With the concave surfaces of the parabolic mirror M5 and the parabolic mirror M6 whose curvatures are different being faced to each other, the arrow Sc4 is longer than the arrows Sc1, Sc2, and Sc3. Accordingly, the optical system of the present example embodiment has a function of expanding the sweep width of the light emitted from the ranging device 2. Therefore, according to the present example embodiment, the ranging device 2 with an expanded sweep width can be provided.

The optical system of the present example embodiment is configured to be able to expand the sweep width in one direction. Therefore, the structure of the ranging device 2 can be thinner and thus is advantageous for space saving when the ranging device 2 is arranged on a shelf top plate, a ceiling face, or the like.

Figure 16A:
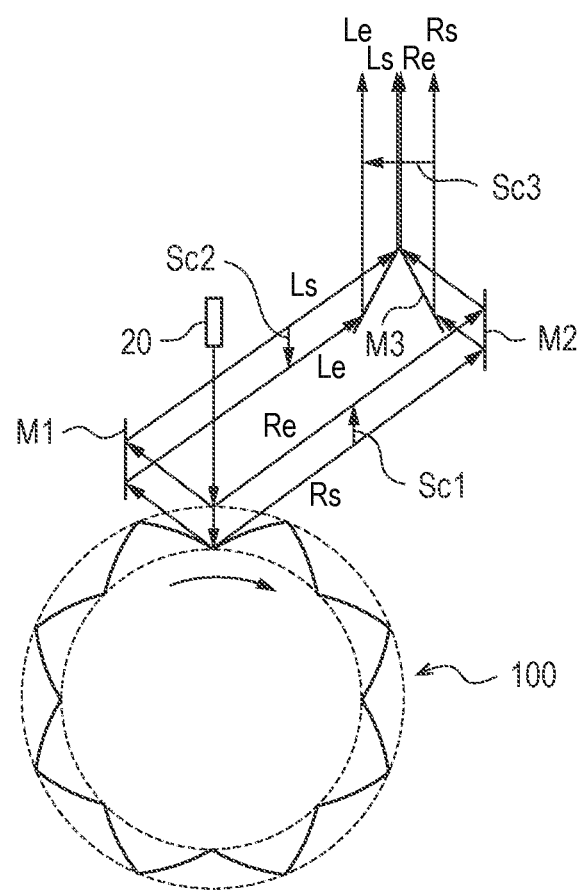
FIG. 16A is a schematic diagram illustrating a configuration of a part of the optical system of the second example embodiment.
Figure 16B:
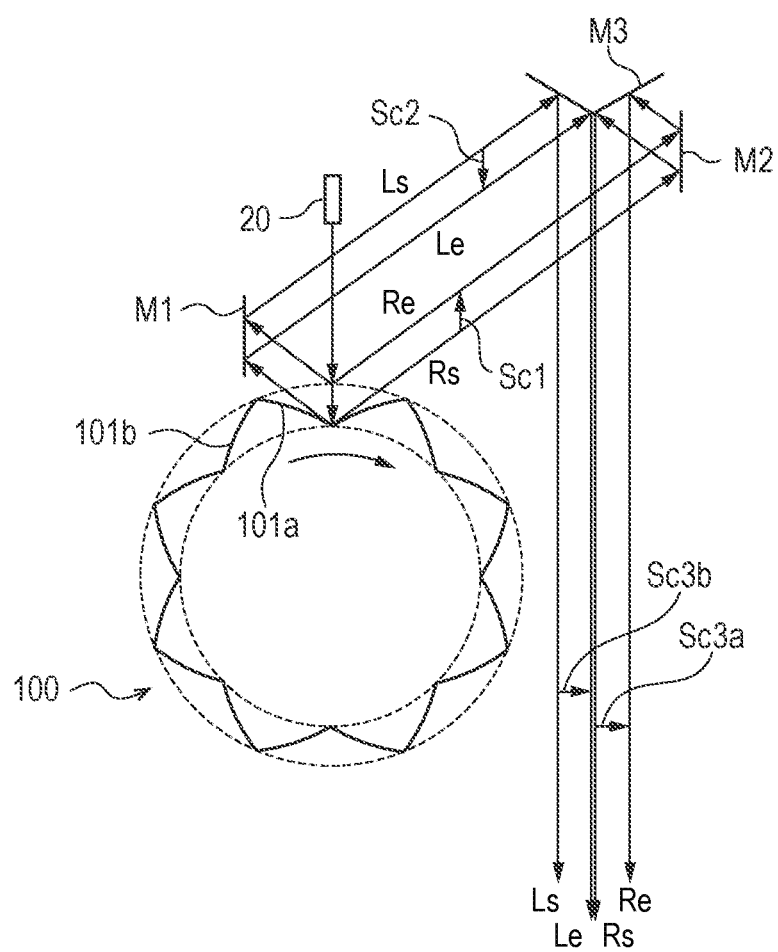
FIG. 16B is a schematic diagram illustrating a modified example of the optical system of the second example embodiment.
Figure 16C:
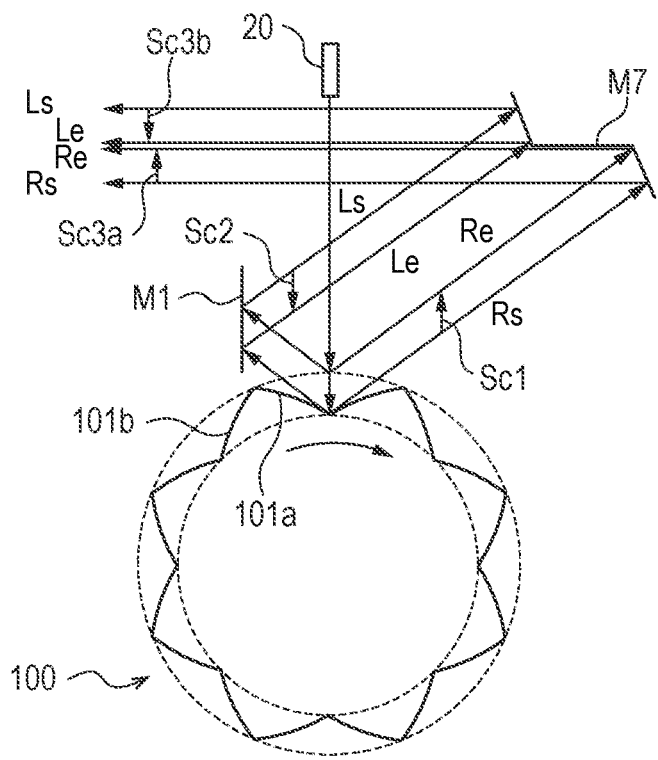
FIG. 16C is a schematic diagram illustrating a modified example of the optical system of the second example embodiment.

FIG. 16A to FIG. 16C are diagrams illustrating a modified example of the configuration of the optical system. FIG. 16A to FIG. 16C illustrate a view in which only the optical path from the sensor unit 20 to the plane mirror group M4 is extracted from the configuration illustrated in FIG. 15. FIG. 16A is a diagram illustrating the same configuration as FIG. 15. In the configuration of FIG. 16A, when the reflection mirror 100 is rotated clockwise from the state of FIG. 16A, the light is swept as indicated by the arrow Sc3.

FIG. 16B is a diagram illustrating a modified example in which the arrangement of the triangular plane mirror M3 differs from the configuration of FIG. 16A. In FIG. 16B, every light that has entered the triangular plane mirror M3 is reflected in the downward direction in FIG. 16B. Thereby, the light sweep order in FIG. 16B differs from that of FIG. 16A. When the reflection mirror 100 is rotated clockwise from the state of FIG. 16B, the light is reflected by a reflection surface 101*a* and swept as indicated by the arrow Sc3*a*. Then, when the surface by which the light is reflected changes to a reflection surface 101*b*, and the light is swept as indicated by the arrow Sc3*b*. While a period from the time the light enters the valley of the reflection surface 101 to the time the light enters the next valley is one cycle of a sweep in the configuration of FIG. 16A, a period from the time the light enters the ridge of the reflection surface 101 to the time the light enters the next ridge is one cycle of a sweep in the configuration of FIG. 16B.

FIG. 16C is a diagram illustrating a modified example in which a Z-type plane mirror M7 is provided instead of the plane mirror M2 and the triangular plane mirror M3 of FIG. 16A. Every light that has entered the Z-type plane mirror M7 is reflected to the left direction in FIG. 16C. Thereby, the change of the light sweep direction in FIG. 16C differs from that of FIG. 16A. When the reflection mirror 100 is rotated clockwise from the state of FIG. 16C, the light is reflected by the reflection surface 101*a* and swept in the upward direction as indicated by the arrow Sc3*a*. Then, when the surface by which the light is reflected changes to the reflection surface 101*b*, the light is swept in the downward direction as indicated by the arrow Sc3*b*. While reflected light moves in parallel continuously in a constant orientation in the configuration of FIG. 16A and FIG. 16B, the orientation in which the reflected light moves in parallel changes discontinuously in the configuration of FIG. 16C. In such a way, the configuration of the optical system can be modified as appropriate in accordance with a required light sweep method.

The configuration of the optical system is not limited to those described above. For example, an optical member such as a plane mirror, a parabolic mirror, or the like may be further added. Further, the reflection surface of a parabolic mirror may not be an accurate parabolic surface as long as it can collect light to obtain the same effect, and when accuracy is tolerated, a spherical mirror or the like may be employed, for example. Further, as a modified example of the optical system using the parabolic mirror, a Cassegrain type, a Gregorian type, or the like may be employed.

Further, at least one of a polarization element and an optical filter element may be additionally arranged on the optical path through which the light emitted from the sensor unit passes. When the polarization element is provided, it is possible that light polarized differently from the light emitted from the ranging device 2 is less likely to be received, and therefore noise due to light emitted from a light source different from the ranging device 2 can be reduced. Further, when the optical filter element is provided, it is possible that light whose wavelength that is different from that of the light emitted from the ranging device 2 is less likely to be received, and also in such a case, noise due to light emitted from a light source different from the ranging device 2 can be reduced.

The circuit forming the ranging device control unit 30 can be arranged on the backside (the convex surface side) of the parabolic mirror M6, for example. Accordingly, the vacant space on the backside of the parabolic mirror M6 can be effectively utilized, and a large reflection mirror 100 can be mounted. With the large reflection mirror 100, the position accuracy of reflected light can be improved, and the moment of inertia of the reflection mirror 100 can be increased, which can stabilize the rotational rate.

The device described in the above example embodiments can also be configured as with the following third example embodiment.

Third Example Embodiment

Figure 17:
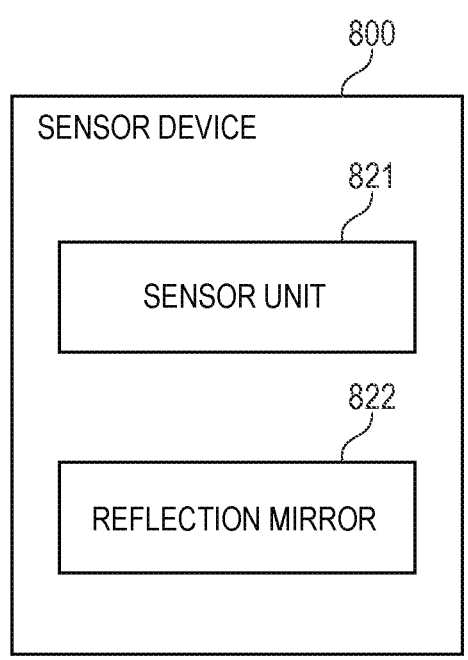
FIG. 17 is a function block diagram of an image processing device according to a third example embodiment.

FIG. 17 is a function block diagram of a sensor device 800 according to the third example embodiment. The sensor device 800 has a sensor unit 821 and a reflection mirror 822. The sensor unit 821 emits light and receives light reflected by an object. The reflection mirror 822 is a columnar reflection mirror having a reflection surface on the side face and is able to be rotated on an axis of the reflection mirror as a rotation axis, and at least a part of the reflection surface forms a logarithmic spiral having the center at the rotation axis in a cross section perpendicular to the rotation axis. The light emitted from the sensor unit 821 and reflected by the reflection surface moves in parallel in response to rotation of the reflection mirror 822, and thereby the light reflected by the reflection surface is swept.

According to the present example embodiment, a sensor device that can achieve good detection accuracy even for a distant object is provided.

Modified Example Embodiments

The present invention is not limited to the example embodiments described above, and various modifications are possible as appropriate within the scope not departing from the spirt of the present invention.

Although a LiDAR device using the FMCW scheme has been mainly illustrated in the above example embodiments as an example for the sensor device to which the present invention may be applied, the sensor device is not limited thereto. The present invention may be applied to any device other than the above as long as it is a sensor device that may detect an object by sweeping light.

The scope of each of the example embodiments further includes a processing method that stores, in a storage medium, a program that causes the configuration of each of the example embodiments to operate so as to implement the function of each of the example embodiments described above, reads the program stored in the storage medium as a code, and executes the program in a computer. That is, the scope of each of the example embodiments also includes a computer readable storage medium. Further, each of the example embodiments includes not only the storage medium in which the program described above is stored but also the program itself. Further, one or two or more components included in the example embodiments described above may be a circuit such as an ASIC, an FPGA, or the like configured to implement the function of each component.

As the storage medium, for example, a floppy (registered trademark) disk, a hard disk, an optical disk, a magneto-optical disk, a Compact Disk (CD)-ROM, a magnetic tape, a nonvolatile memory card, or a ROM can be used. Further, the scope of each of the example embodiments includes an example that operates on OS to perform a process in cooperation with another software or a function of an add-in board without being limited to an example that performs a process by an individual program stored in the storage medium.

Note that all of the example embodiments described above are mere embodied examples in implementing the present invention, and the technical scope of the present invention should not be construed in a limiting sense by these example embodiments. That is, the present invention can be implemented in various forms without departing from the technical concept or the primary feature thereof.

The whole or part of the example embodiments disclosed above can be described as, but not limited to, the following supplementary notes.

(Supplementary Note 1)

A sensor device comprising:
a sensor unit that emits light and receives light reflected by an object; and
a reflection mirror that is a columnar reflection mirror having a reflection surface on a side face and is configured to be rotated on an axis of the reflection mirror as a rotation axis, wherein at least a part of the reflection surface forms at least one logarithmic spiral having the center at the rotation axis in a cross section perpendicular to the rotation axis,
wherein when light emitted from the sensor unit and reflected by the reflection surface moves in parallel in response to rotation of the reflection mirror, the light reflected by the reflection surface is swept.

(Supplementary Note 2)

The sensor device according to supplementary note 1, wherein the entire reflection surface that light emitted from the sensor unit enters forms the logarithmic spiral in the cross section perpendicular to the rotation axis.

(Supplementary Note 3)

The sensor device according to supplementary note 1 or 2, wherein in the cross section perpendicular to the rotation axis, the reflection surface forms a closed curve in which a plurality of logarithmic spirals are continuously connected.

(Supplementary Note 4)

The sensor device according to any one of supplementary notes 1 to 3, wherein when a polar equation representing a curve of each of the logarithmic spirals is expressed by Equation (2):

$$r = a \cdot \exp(\theta \cdot \cot b) \qquad (2)$$

where r denotes a radius in polar coordinates, θ denotes a polar angle in the polar coordinates, a denotes a value of r when a value of θ is zero, and b is an angle of a line passing through the center of the logarithmic spiral relative to a tangent line of the logarithmic spiral,
a value of b in degree measure is greater than or equal to 60 degrees and less than 90 degrees.

(Supplementary Note 5)

The sensor device according to supplementary note 4, wherein the value of b in degree measure is greater than or equal to 60 degrees and less than 80 degrees.

(Supplementary Note 6)

The sensor device according to supplementary note 4, wherein the value of b in degree measure is greater than or equal to 60 degrees and less than 70 degrees.

(Supplementary Note 7)

The sensor device according to supplementary note 4, wherein the value of b in degree measure is around 60 degrees.

(Supplementary Note 8)

The sensor device according to any one of supplementary notes 1 to 7, wherein light reflected by the reflection surface moves in parallel continuously with a constant orientation in response to rotation of the reflection surface.

(Supplementary Note 9)

The sensor device according to any one of supplementary notes 1 to 7, wherein an orientation in which light reflected by the reflection surface moves in parallel changes discontinuously in response to rotation of the reflection surface.

(Supplementary Note 10)

The sensor device according to any one of supplementary notes 1 to 9 further comprising an optical system that expands a sweep width used when light reflected by the reflection mirror is swept in response to rotation of the reflection mirror.

(Supplementary Note 11)

The sensor device according to supplementary note 10, wherein the optical system includes two parabolic mirrors whose concave surfaces are faced to each other.

(Supplementary Note 12)

The sensor device according to supplementary note 11, wherein the two parabolic mirrors are arranged so that focal points are the same.

(Supplementary Note 13)

The sensor device according to supplementary note 12, wherein the optical system is provided near the focal points and further include a diaphragm that restricts a width of an optical path.

(Supplementary Note 14)

The sensor device according to any one of supplementary notes 10 to 13, wherein a plane on which light immediately after reflected by the reflection mirror moves in parallel in response to rotation of the reflection mirror and a plane on which light after passing through the optical system moves in parallel are planes different from each other.

(Supplementary Note 15)

The sensor device according to any one of supplementary notes 1 to 14 further comprising a polarization element arranged on an optical path through which light emitted from the sensor unit passes.

(Supplementary Note 16)

The sensor device according to any one of supplementary notes 1 to 15 further comprising an optical filter element arranged on an optical path through which light emitted from the sensor unit passes.

(Supplementary Note 17)

The sensor device according to any one of supplementary notes 1 to 16, wherein the sensor device is a Light Detection and Ranging (LiDAR) device using a Frequency Modulated Continuous Wave (FMCW) scheme.

This application is based upon and claims the benefit of priority from Japanese Patent Application No. 2018-017802, filed on Feb. 5, 2018, the disclosure of which is incorporated herein in its entirety by reference.

REFERENCE SIGNS LIST 1 object
2 ranging device
10 reflection mirror unit
20, 821 sensor unit
100, 822 reflection mirror
800 sensor device

What is claimed is:
1. A sensor device comprising:
a sensor unit that emits light and receives light reflected by an object; and
a reflection mirror that is a columnar reflection mirror having a reflection surface on a side face and is configured to be rotated on an axis of the reflection mirror as a rotation axis, wherein at least a part of the reflection surface forms at least one logarithmic spiral having the center at the rotation axis in a cross section perpendicular to the rotation axis,
wherein when light emitted from the sensor unit and reflected by the reflection surface moves in parallel in response to rotation of the reflection mirror, the light reflected by the reflection surface is swept.

2. The sensor device according to claim 1, wherein the entire reflection surface that light emitted from the sensor unit enters forms the logarithmic spiral in the cross section perpendicular to the rotation axis.

3. The sensor device according to claim 1, wherein in the cross section perpendicular to the rotation axis, the reflection surface forms a closed curve in which a plurality of logarithmic spirals are continuously connected.

4. The sensor device according to claim 1, wherein when a polar equation representing a curve of each of the logarithmic spirals is expressed by Equation (2):

$$r = a \cdot \exp(\theta \cdot \cot b) \qquad (2)$$

where r denotes a radius in polar coordinates, $\theta$ denotes a polar angle in the polar coordinates, a denotes a value of r when a value of $\theta$ is zero, and b is an angle of a line passing through the center of the logarithmic spiral relative to a tangent line of the logarithmic spiral,
a value of b in degree measure is greater than or equal to 60 degrees and less than 90 degrees.

5. The sensor device according to claim 4, wherein the value of b in degree measure is greater than or equal to 60 degrees and less than 80 degrees.

6. The sensor device according to claim 4, wherein the value of b in degree measure is greater than or equal to 60 degrees and less than 70 degrees.

7. The sensor device according to claim 4, wherein the value of b in degree measure is around 60 degrees.

8. The sensor device according to claim 1, wherein light reflected by the reflection surface moves in parallel continuously with a constant orientation in response to rotation of the reflection surface.

9. The sensor device according to claim 1, wherein an orientation in which light reflected by the reflection surface moves in parallel changes discontinuously in response to rotation of the reflection surface.

10. The sensor device according to claim 1 further comprising an optical system that expands a sweep width used when light reflected by the reflection mirror is swept in response to rotation of the reflection mirror.

11. The sensor device according to claim 10, wherein the optical system includes two parabolic mirrors whose concave surfaces are faced to each other.

12. The sensor device according to claim 11, wherein the two parabolic mirrors are arranged so that focal points are the same.

13. The sensor device according to claim 12, wherein the optical system is provided near the focal points and further include a diaphragm that restricts a width of an optical path.

14. The sensor device according to claim 10, wherein a plane on which light immediately after reflected by the reflection mirror moves in parallel in response to rotation of the reflection mirror and a plane on which light after passing through the optical system moves in parallel are planes different from each other.

15. The sensor device according to claim 1 further comprising a polarization element arranged on an optical path through which light emitted from the sensor unit passes.

16. The sensor device according to claim 1 further comprising an optical filter element arranged on an optical path through which light emitted from the sensor unit passes.

17. The sensor device according to claim 1, wherein the sensor device is a Light Detection and Ranging (LiDAR) device using a Frequency Modulated Continuous Wave (FMCW) scheme.

* * * * *